UNITED STATES PATENT OFFICE.

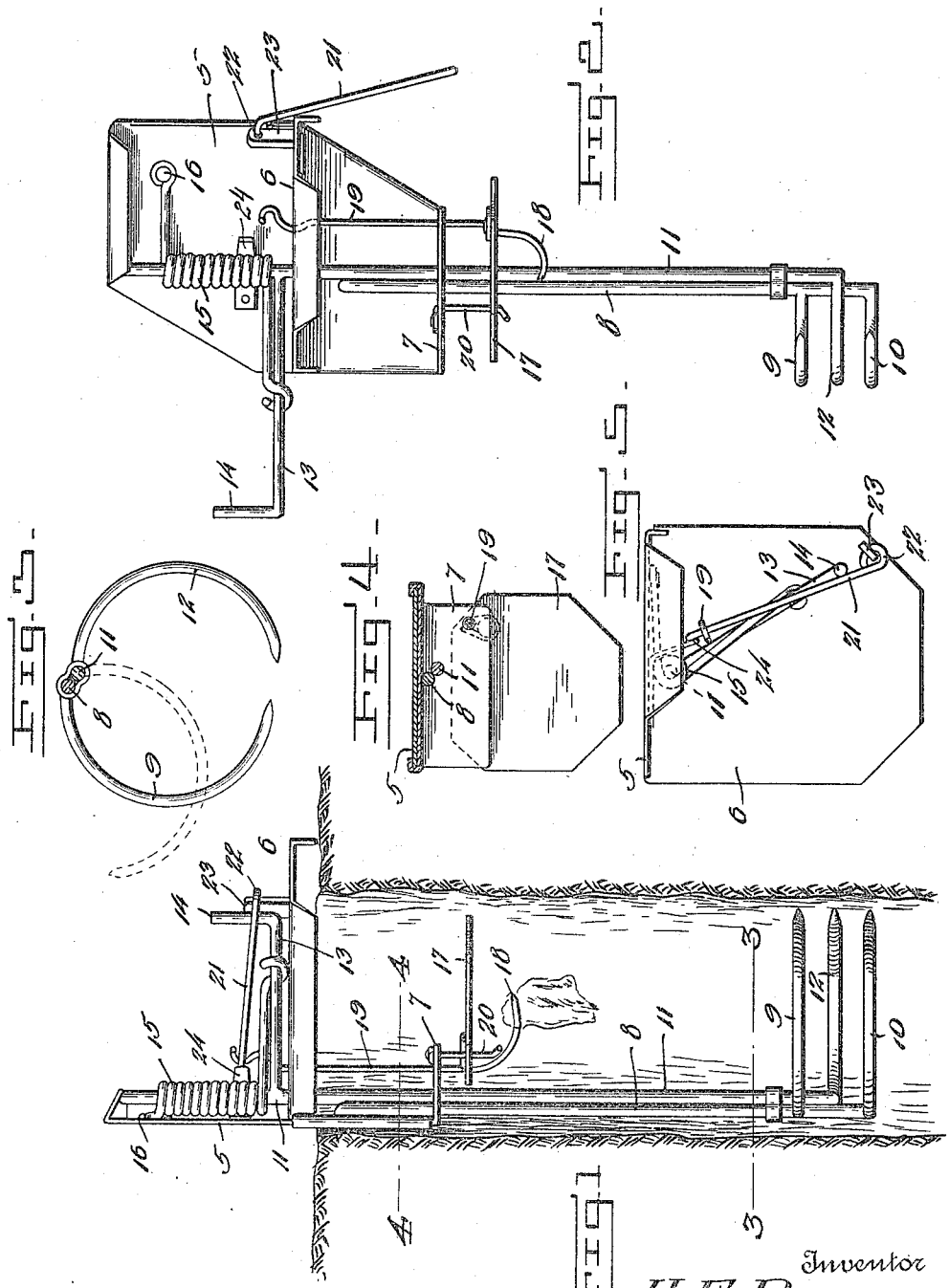

HARRY E. BROWN, OF SALEM, OREGON.

ANIMAL-TRAP.

1,190,508.

Specification of Letters Patent.  Patented July 11, 1916.

Application filed April 24, 1916. Serial No. 93,228.

*To all whom it may concern:*

Be it known that I, HARRY E. BROWN, a citizen of the United States, residing at Salem, in the county of Marion and State of Oregon, have invented certain new and useful Improvements in Animal-Traps, of which the following is a specification.

This invention relates to animal traps and more particularly to traps for gophers, moles or other animals that live in burrows.

The object of the invention is to provide a simple and efficient trap adapted to be placed in position in the burrow and having the parts so arranged that contact of the animal therewith will release an element by which the animal is impaled.

Further objects and advantages of the invention will be set forth in the detailed description which now follows.

In the accompanying drawing Figure 1 is a side elevation of the trap set, and in place in the burrow. Fig. 2 is a front view of the trap with the parts in sprung position. Figs. 3 and 4 are sections upon lines 3—3 and 4—4 respectively of Fig. 1, and Fig. 5 is a plan view of the trap set.

Referring to the drawing it will be seen that the trap comprises plates 5 and 6, the plate 6 being disposed substantially at right angles to the plate 5. The plate 5 carries a flange 7 bent into substantial parallelism with plate 6. Fixedly secured to the plate 5 and passing through flange 7 is a rod 8, said rod carrying a pair of curved impaling prongs 9 and 10 at its lower end, it being understood that these prongs are fixedly held by the rod 8. Journaled in plate 6 and flange 7 is an oscillatory rod 11, said rod carrying at its lower end a curved prong 12 which works between the prongs 9 and 10. The rod 11 carries a crank arm 13 that is provided with an up-turned portion 14. A heavy spring 15 surrounds the upper portion of the rod 11 and has one of its ends fixed to the plate 5 at 16. The other end of the spring engages the crank arm 13 and normally tends to throw the prong 12 around to cause it to pass between the prongs 9 and 10. A contact plate 17 carries a bait retaining hook 18 and a releasing rod 19, said releasing rod being slidably disposed in the flange 7. A guide rod 20 holds the contact plate 17 against swinging but permits it to slide toward and from flange 7, it being understood that the plate 17 is slidable upon the rod 20. A trigger wire 21 is pivoted at 22 to an ear 23 of plate 5, and when the device is set this trigger lies in front of the portion 14 of the crank arm and holds the device in set position against the tension of spring 15. This is accomplished by engaging the free end of the trigger wire behind a stop plate 24. The release rod is provided with a bent end which engages the trigger wire so that whether the release rod be pulled or pushed by the animal pulling upon the bait or pressing against plate 17 the trigger wire will surely be dislodged from behind the keeper 24 to permit the spring 15 to throw the crank arm 13 forcibly around and to turn rod 11 upon its axis to cause its movable prong 12 to pass between the fixed prongs 9 and 10 to thereby trap the animal.

Having described my invention, what I claim is:

1. An animal trap comprising an oscillatory spring-actuated impaling member, a crank arm carried thereby, a pivoted trigger wire, a fixed abutment behind which the end of said trigger wire engages, a slidably mounted releasing rod for dislodging the trigger wire when moved in either direction and means carried by said rod whereby the animal actuates the same.

2. A device of the character described, comprising a support, fixed impaling members supported therefrom, an oscillatory impaling member mounted upon said support and co-acting with the fixed impaling members, a crank arm carried by the oscillatory impaling member, a spring for actuating the oscillatory impaling member, a trigger wire and means for dislodging said trigger wire to permit the spring to act, said means comprising a flange carried by the support, a releasing rod slidable through said flange and operable to release the trigger when moved in either direction, a contact plate carried by the releasing rod and a guide rod carried by the flange with which said contact plate slidably engages.

3. A device of the character described, comprising a support, fixed impaling members supported therefrom, an oscillatory impaling member mounted upon said support and co-acting with the fixed impaling members, a crank arm carried by the oscillatory impaling member, a spring for actuating the oscillatory impaling member, a trigger wire and means for dislodging said trigger wire to permit the spring to act, said means comprising a flange carried by the support, a releasing rod slidable through said flange and operable release trigger when moved in either direction, a contact plate carried by the releasing rod and a guide rod carried by the flange with which said contact plate slidably engages and a bait retaining element carried by the contact plate.

In testimony whereof I affix my signature in the presence of two witnesses.

HARRY E. BROWN.

Witnesses:
H. S. RADCLIFF,
WM. FLEMING.

Copies of this patent may be obtained for five cents each, by addressing the "Commissioner of Patents, Washington, D. C."